(12) United States Patent
Ban et al.

(10) Patent No.: US 7,568,648 B2
(45) Date of Patent: Aug. 4, 2009

(54) TAPE CARTRIDGE

(75) Inventors: Keiji Ban, Ibaraki (JP); Toshiro Nishiwaki, Ibaraki (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 100 days.

(21) Appl. No.: 11/724,263

(22) Filed: Mar. 15, 2007

(65) Prior Publication Data

US 2008/0121747 A1 May 29, 2008

(30) Foreign Application Priority Data

Mar. 24, 2006 (JP) ............................. 2006-082782

(51) Int. Cl.
*G11B 23/087* (2006.01)

(52) U.S. Cl. ...................... 242/345; 242/347

(58) Field of Classification Search ................ 242/338, 242/338.1, 338.2, 341, 343, 345, 345.2, 345.3, 242/347

See application file for complete search history.

(56) References Cited

U.S. PATENT DOCUMENTS

| | | | | |
|---|---|---|---|---|
| 4,466,036 A | * | 8/1984 | Ishida et al. ............. | 242/345.3 |
| 4,672,498 A | * | 6/1987 | Harada ..................... | 242/345.2 |
| 4,681,280 A | * | 7/1987 | Duurland et al. ............ | 242/340 |
| 4,706,149 A | * | 11/1987 | Machida et al. ............. | 242/347 |
| 4,743,992 A | * | 5/1988 | Komiyama et al. ...... | 242/345.3 |
| 4,840,326 A | * | 6/1989 | Katagiri et al. ............. | 242/345 |
| 5,229,906 A | * | 7/1993 | Katagiri et al. ............. | 242/345 |
| 6,279,846 B1 | * | 8/2001 | Collins ....................... | 242/345 |
| 2001/0006200 A1 | * | 7/2001 | Onmori et al. ........... | 242/345.3 |
| 2008/0149753 A1 | * | 6/2008 | Nishiwaki et al. ........... | 242/347 |
| 2008/0185471 A1 | * | 8/2008 | Deckers et al. ............. | 242/345 |

FOREIGN PATENT DOCUMENTS

JP 6-97549 B2 11/1994

* cited by examiner

*Primary Examiner*—William A Rivera
(74) *Attorney, Agent, or Firm*—Birch, Stewart, Kolasch & Birch, LLP

(57) ABSTRACT

To provide a tape cartridge capable of preventing an area near the posterior rim a tape winding layer from colliding with a casing wall to cause the tape edge to be damaged upon reception of dropping impact in the state where the upper and lower sides of the tape cartridge are reversed, so that the magnetic tape can constantly be maintained in an appropriate state. A pair of right and left hubs for taking up the magnetic tape, a hub locking structure are provided inside a main casing. The hub locking structure is placed on the anterior side of the inner surface of an upper casing in the main casing. A regulating body for regulating inclination of the tape winding layer is formed so as to bulge on the rear side of the inner surface of the upper casing. The regulating body is formed in an oblong rib shape having a bulge size almost identical to a thickness size of the hub locking structure in the inner surface of the upper casing. A flank for avoiding collision with the tape winding layer is formed in a side edge corner of the regulating body. The flank is formed by rounding the end section of the regulating body.

8 Claims, 7 Drawing Sheets

TAPE CARTRIDGE

BACKGROUND OF THE INVENTION

The present invention relates to a tape cartridge for recording computer data and the like, and more particularly relates to a tape cartridge in which a magnetic tape is wound onto a hub.

The basic structure of the tape cartridge in which the magnetic tape is wound onto the hub is publicly known, for example, in JP 6-97549 B (see 20th line in left column on third page, FIG. 3). Therein, the tape feed structure is disclosed in which hubs are placed on the right and left sides in a main casing, and a magnetic tape unreeled from one hub is reeled onto the other hub. A hub locking structure is provided inside the main casing for regulating rotation of the hub during unused time to prevent tape slacks.

The hub locking structure is composed of a lock gear having lock teeth in a gear teeth shape formed on the peripheral surface, a lock frame sliding and shifting back and forth, a lock claw integrally formed with the lock frame for engaging with and disengaging from the lock gear, and a spring for biasing and moving the hook frame toward the lock gear. Component parts except the lock gear are built into the inner surface of the upper case. It is to be noted that the lock gear is molded integrally with the hub.

In the tape cartridge structured to have the magnetic tape wound onto the hub, the upper surface and the undersurface of a tape winding layer wound onto the hub are exposed to the inside of the main casing unlike the tape reel having upper and lower flanges. Therefore, when the tape cartridge receives dropping impact, there is a possibility that the tape winding layer may collide with the inside wail of the main casing and the tape edge may be damaged. In order to reduce contact friction of the tape winding layer at the time of rotational driving, slippery sheets are placed on the upper and lower walls inside the main casing, so that the damage of the tape edge can be prevented by the slippery sheets to some degree.

However, if a hub locking structure is placed at the anterior portion of the inner surface of the upper case, the anterior side of the tape winding layer is supported by the lock frame through the slippery sheet, in the state where the upper and lower sides of the tape cartridge are reversed, and therefore the hub and the tape winding layer are supported in an inclined state. Consequently, in the case where the tape cartridge receives dropping impact in the state of its upper and lower sides being reversed, the area near the rim of the posterior portion of the tape winding layer may collide with the case wall, which may cause the tape edge to be damaged or cause a part of the outside of the tape winding layer to shift toward the shaft center of the hub.

SUMMARY OF THE INVENTION

An object of the present invention is to provide a tape cartridge capable or preventing the area near the posterior rim of a tape winding layer from colliding with a casing wall to cause the tape edge to be damaged, or preventing a part of the outer side of the tape winding layer from shifting toward the shaft center of a hub when the tape cartridge receives dropping impact in the state that the upper and lower sides of the tape cartridge are reversed, so that the magnetic tape can constantly be maintained in an appropriate state.

In order to accomplish the object, the present invention provides a tape cartridge comprising: a pair of right and left hubs for taking up a magnetic tape; and a hub locking structure for unrotatably locking and retaining both the hubs during unused time, each provided inside a main casing, wherein the hub locking structure is placed on a anterior side of an inner surface of an upper casing which constitutes the main casing, and wherein a regulating body for regulating inclination of a tape winding layer wound onto the hub is formed so as to bulge on a rear side of the inner surface of the upper casing.

In the tape cartridge of the present invention, the regulating body may be formed in an oblong rib shape having a bulge size almost identical to a thickness size of the hub locking structure in the inner surface of the upper casing, and a flank for avoiding collision with the tape winding layer may be formed in a side edge corner of the regulating body.

In the tape cartridge of the present invention, the flank may be formed by rounding an end section of the regulating body from a bulge end face to an inner surface side of the upper casing.

In the tape cartridge of the present invention, the flank may be formed by inclining an end section of the regulating body downward from a bulge end face to an inner surface side of the upper casing.

In the tape cartridge of the present invention, front and rear edges of the bulge end face and the flank of the regulating body may be rounded respectively.

Further in the tape cartridge of the present invention, a window plate formed from a transparent plastic material may be fixed to the inner surface of the upper casing, and the regulating body may integrally be formed in the inner surface of the window plate.

In the present invention, the regulating body is formed so as to bulge on the rear side or the inner surface of the upper casing, and therefore when the tape cartridge receives dropping impact in the state of its upper and lower sides being reversed, the front and rear faces of the tape winding layer are supported by the hub locking structure and the regulating body. This makes it possible to prevent the tape winding layer from inclining downward to the rear section of the casing. Therefore, according to the tape cartridge of the present invention, when the tape cartridge receives large external force such as dropping impact, if becomes possible to completely remove the external force locally acting on the posterior portion of the tape winding layer so as to eliminate the damage of the tape edge, as well as to prevent the tape winding layer from gaining poor winding appearance due to such causes as a part of the outer side of the tape winding layer shifting toward the axial center of the hub. This makes it possible to obtain a tape cartridge capable of constantly maintaining the magnetic tape in an appropriate state.

If the regulating body is formed in the shape of an oblong rib and the bulge size thereof is set almost identical to the thickness size of the hub locking structure, the regulating body extending across the posterior portion of the tape winding layer can support the tape winding layer in a wide range so that large external force such as dropping impact can be received in a distributed state. Further, the front and rear faces of the tape winding layer can be supported almost simultaneously by the hub locking structure and the regulating body, so that tilting of the tape winding layer can be regulated at an early stage, and damage of the tape edge can be prevented more effectively as a whole. Moreover, the flank is formed in the side edge corner of the regulating body, and therefore when the tape winding layer tends to tilt obliquely backward, the side edge corner of the regulating body collides with the tape winding layer, which makes it possible to eliminate the external force acting locally on the tape winding layer.

According to the flank formed by rounding the bulge end face toward the inner surface side of the upper casing, the bulge end face and the flank of the regulating body are made to continue smoothly without a boundary therebetween, which makes it possible to prevent a corner section (corner) having a possibility of colliding with the tape winding layer from being formed in both ends of the regulating body, and thereby allows constant and certain elimination of damage of the tape edge.

According to the flank which is inclined downward floors the bulge and face to the inner surface side of the upper casing, a variation width of the bulge size near the boundary between the flank and the bulge end face can be increased, so that when the tape winding layer tilts within the limits of the margin size, it becomes possible to sufficiently prevent the tape winding layer from coming into contact with the flank.

If the front and rear edges of the respective bulge end face and the downward inclined face are rounded, it becomes possible to prevent the tape edge in the periphery of the tape winding layer from being damaged by coming into contact with the front and rear edges of the bulge end face and the downward inclined face, so that the damage of the tape edge can be prevented still more effectively.

If the regulating body is formed integrally with a window plate placed on the inner surface of the upper casing, the projection site of the regulating body can be decreased by the thickness size of the window plate compared with, for example, the case where the negotiating body is formed integrally with the upper casing, so that poor molding of the upper casing relating to addition of the regulating body is avoidable.

BRIEF DESCRIPTION OF THE DRAWINGS

The present invention will be explained further with reference to the accompanying drawings, where like component members are designated by like reference numerals, in which.

DETAILED DESCRIPTION OF THE PREFERRED EMBODIMENTS

Figure 1:
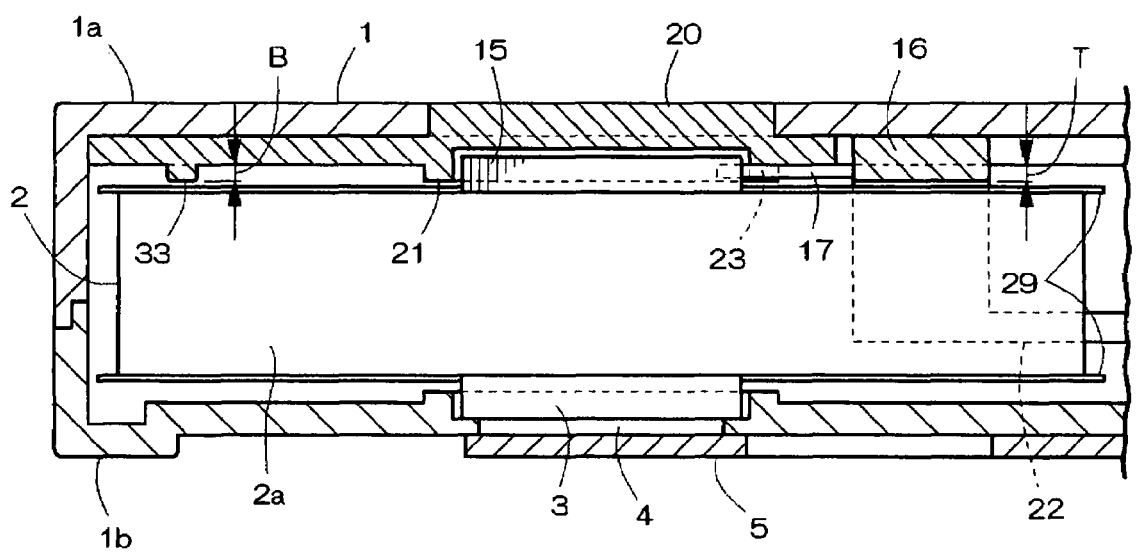
FIG. 1 is a cross-sectional view taken along A-A line in FIG. 3.
Figure 2:
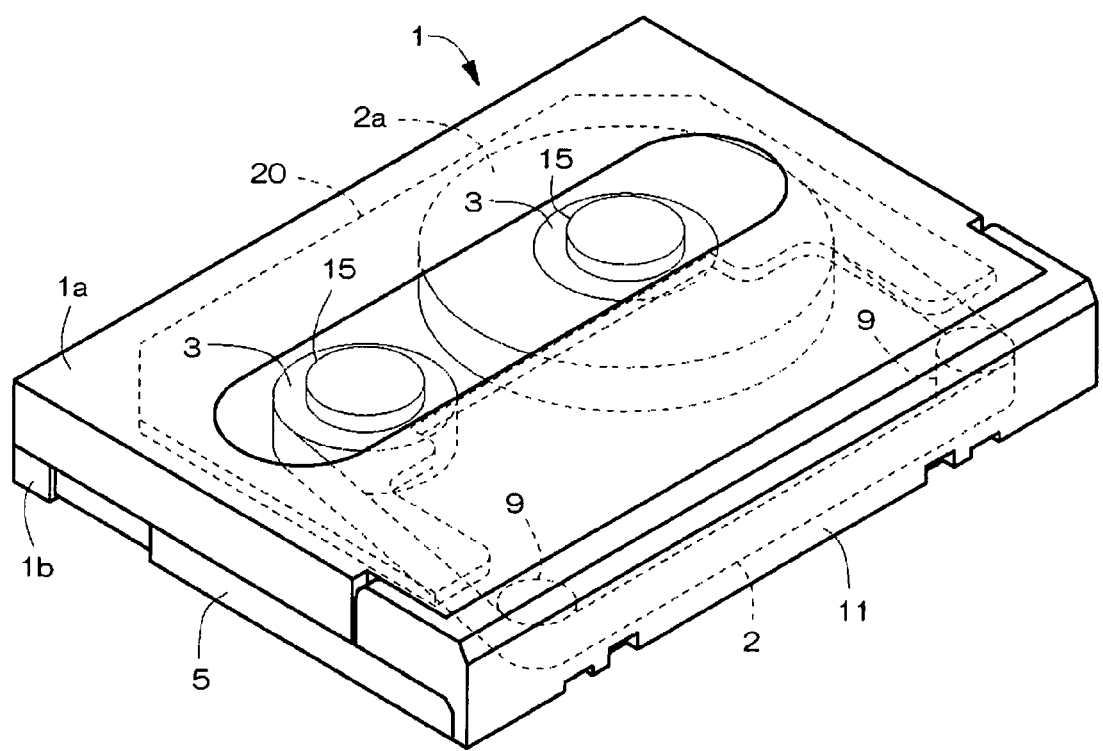
FIG. 2 is the external perspective view of a tape cartridge.
Figure 3:
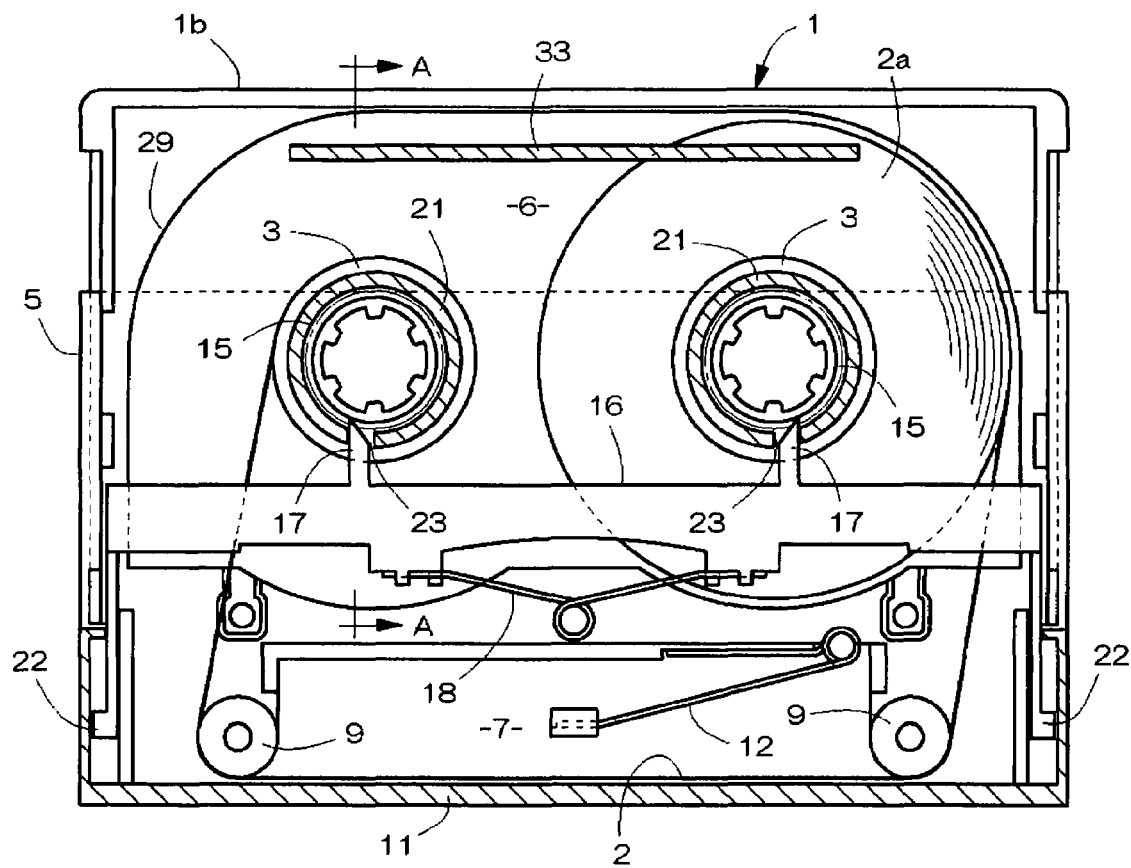
FIG. 3 is an internal top view of the tape cartridge.
Figure 6:
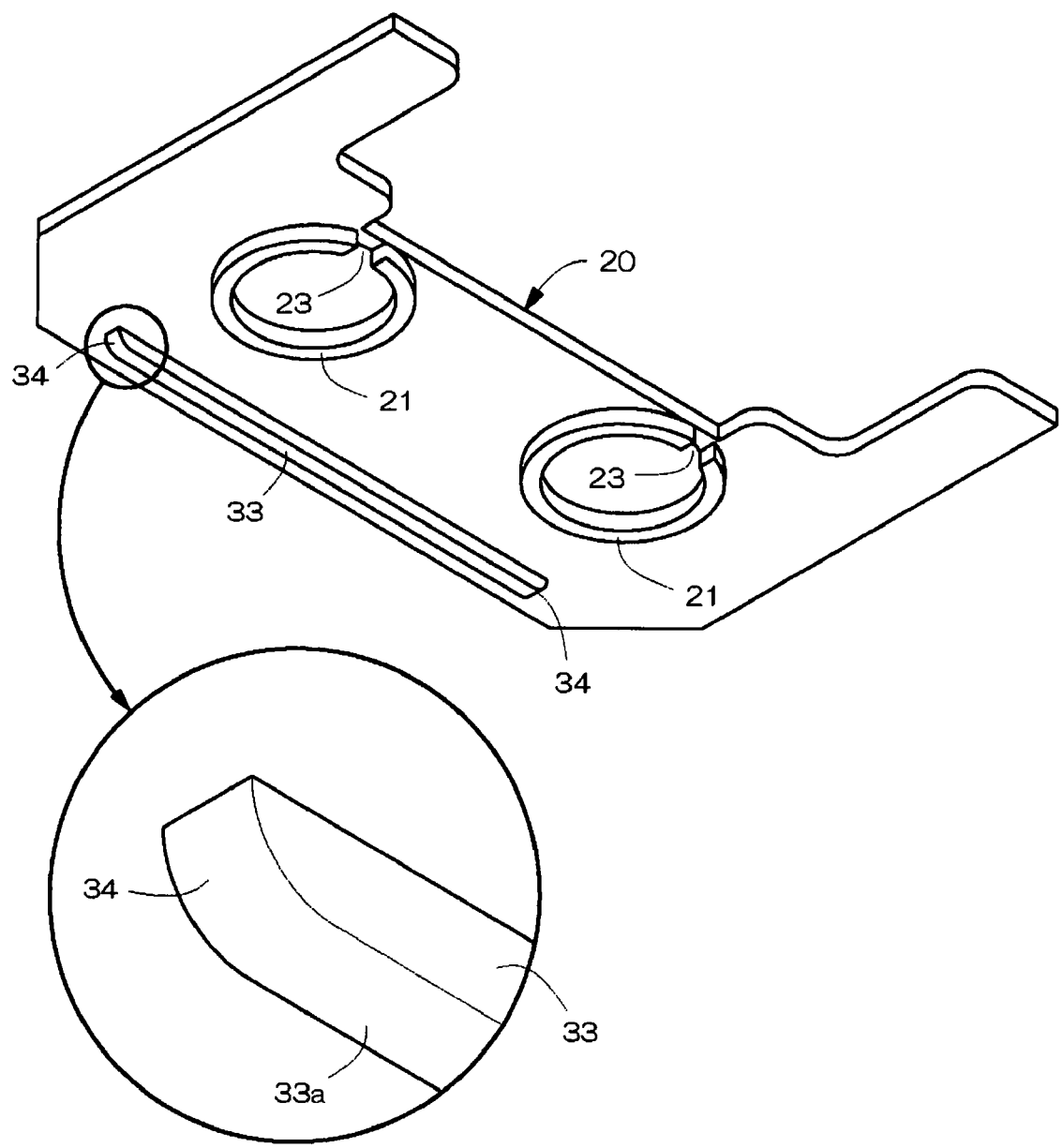
FIG. 6 is a perspective view of a window plate.

A tape cartridge in an embodiment of the present invention is shown in FIG. 1 trough FIG. 6. In FIGS. 2 and 3, the tape cartridge is structured so that a pair of right and left hubs 3, 3 for taking up a magnetic tape 2 and a hub locking structure for unrotatably locking and retaining both the hubs 3 during unused time are placed inside a thin box-like main casing 1 and that a shutter 5 which opens and closes a drive hole 4 for the hub 3 (see FIG. 1) is placed on the undersurface side of the main casing 1.

The main casing 1 is structured by joining upper and lower casings 1a, 1b which were divided into upper and lower parts, and the inside of the main casing 1 is divided into a main chamber 6 for housing the hub 3, the hub locking structure and the like, and a loading pocket 7 provided in the front part of the main chamber 6. The main chamber 6 and the loading pocket 7 are partitioned by a partition wall 8 provided in the inner surface of the upper and lower casings 1a, 1b. A pair of tape guides 9, which are provided on the right and left sides of the loading pocket 7, guide and support the magnetic tape 7 along the front surface of the loading pocket 7.

The front and the upper surfaces of the loading pocket 7 during unused time are covered with a lid 11 attached to the upper casing 1a, while the undersurface of the loading pocket 7 is covered with a shutter 5. The lid 11 is closably biased by an unshown helical torsion-type spring, while the shutter 5 is closably biased by a helical torsion-type spring 12 shown in FIG. 3.

Upon loading of a tape cartridge onto the tape drive, first, the shutter 5 is subjected to opening operation toward the rear side of the casing against the biasing force of she spring 12, by which the undersurface and the drive hole 4 of the loading pocket 7 is opened. Next, the lid 11 is subjected to upward swing operation against the biasing force of the spring, by which the front surface of the loading pocket 7 is opened. Simultaneously, the hub locking structure is subjected to unlocking operation by using the upward swing operation of the lid 11, by which the hub 3 is put in the state ready for rotational drive. In this state, the driving shaft on the side of the tape drive engages with the hub 3, so that the magnetic tape 2 retained by the right and left tape guides 9 can be drawn out to the external surface of the main casing 1 with use of a loading pin.

In FIG. 3, the hub locking structure is composed of a lock gear 15 having lock teeth in a gear teeth shape formed on the peripheral surface in a circumferential state, a lock frame 16 sliding and shifting in back-and-forth direction, a lock claw 17 integrally formed with the lock frame 16, and a spring 18 for biasing and moving the lock frame 16 toward the lock gear 15. The lock gear 15 is molded integrally with the hub 3, and is surrounded with a ring wall 21 provided on the inner surface of a window plate 20 (see FIG. 1).

An interlocking piece 22 is integrally formed, on both sides of the lock frame 16, and by pulling out these interlocking pieces 22 to the front side of the casing on the side wall of the lid 11, unlocking operation of the lock frame 16 can be performed against the biasing force of the spring 18. A notch 23 for allowing entrance and exit of the look claw 17 is formed on the front side of the ring wall 21. The spring 18 is composed of a helical torsion spring which holds out a pair of long spring arms connected to a coil section thereof. As shown in FIG. 3, a pair of right and left spring arms of the spring 18 are engaged with and fixed to the lock frame 16, while the coil section of the spring 18 is supported by the partition wall 8.

Figure 4:
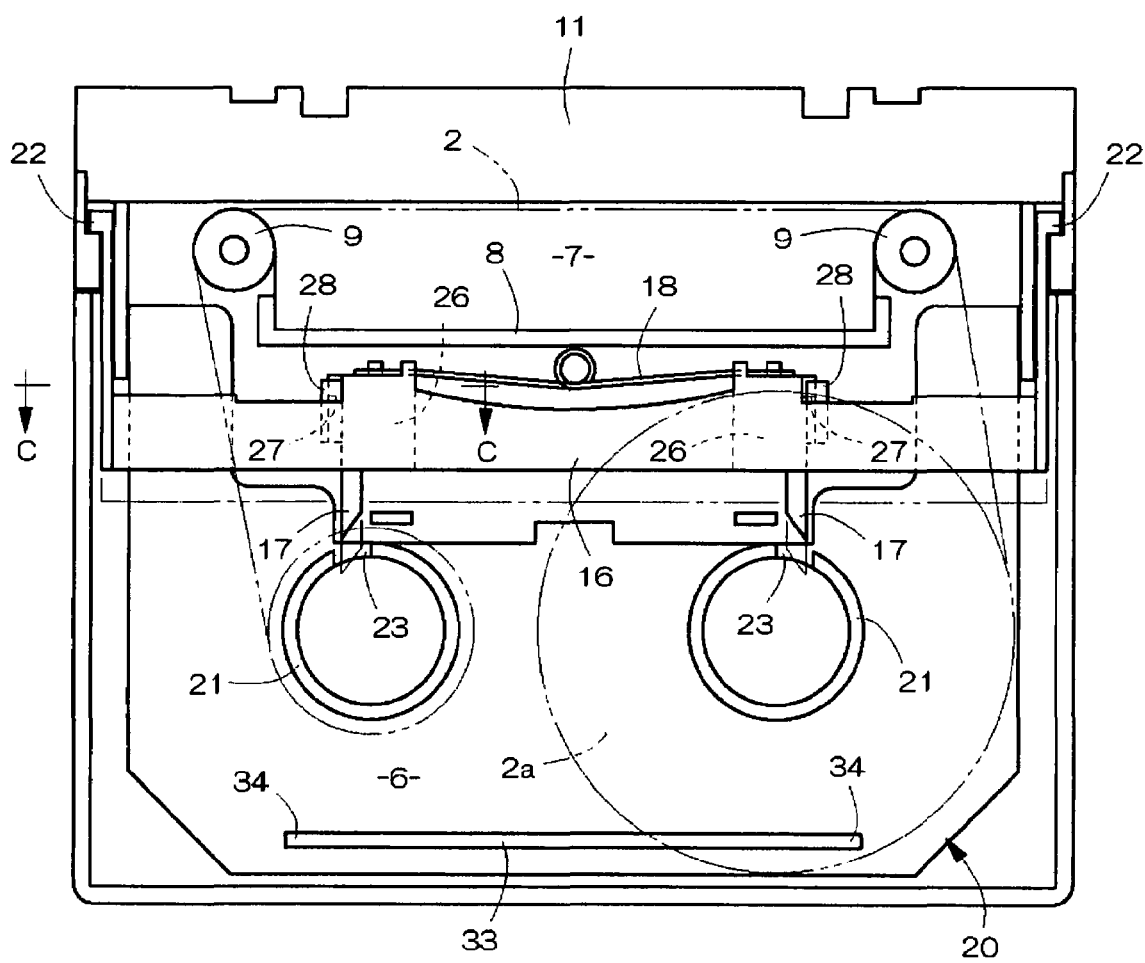
FIG. 4 is a bottom view of an upper casing with a hub locking structure attached thereto.
Figure 5:
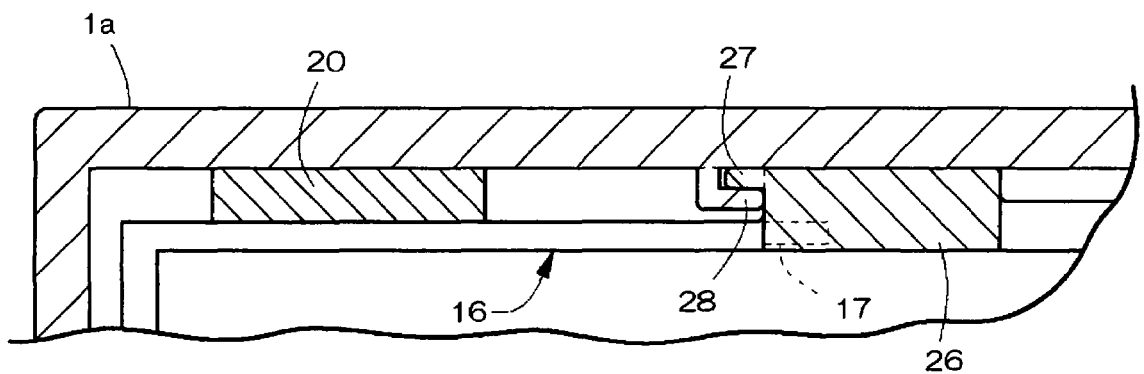
FIG. 5 is a cross sectional view taken along C-C line in FIG. 4.

As shown in FIGS. 4 and 5, a pair of slide blocks 26 are integrally formed in right and left halfway sections on the side of the upper surface of the lock frame 16, with engaging pieces 27 being jutted out on their external lateral surfaces thereof. These engaging pieces 27 are engaged with and mounted on guide pieces 28 provided on the inner surface of the upper casing 1a, so that the lock frame 16 is guided and supported in a slidable manner in the back-and-forth direction. Since the look frame 16 in this state is supported with the guide pieces 28, it will not depart from the upper casing 1a. In FIG. 1, reference numeral 29 denotes a slippery sheet made from plastic.

In the state where the upper side and lower sides of the tape cartridge, which has the hub locking structure placed at the anterior portion of the inner surface of the upper casing 1a, are reversed, the anterior side of a tape winding layer 2a wound onto the hub 3 is supported by the lock frame 16 via the slippery sheet 29, so that the hub 3 and the tape winding layer 2a are put in an inclined state. In order to prevent such inclination of the hub 3 and the tape winding layer 2a, a regulating body 33 for supporting the tape winding layer 2a is formed on the rear side of the inner surface of the upper casing 1a. In this embodiment, the window plate 20 made from transparent plastic material fixed to the inner surface of the upper casing 1a is used to form the regulating body 33 integrally therewith.

As shown in FIG. 6, the regulating body 33 is formed as a horizontally long rib with a square cross section, which extends across the winding layer region of the tape winding layer 2a wound onto the hub 3. As shown in FIG. 1, the bulge size B of the regulating body 33 is set identical to the thickness size T of the lock frame 16 mounted on the inner surface of the upper casing 1a. Therefore, in the state where the upper side and lower sides of the tape cartridge are reversed, it becomes possible to support the tape winding layer 2a with the regulating body 33 and the lock frame 16 on the same plane, so that tilting of the hub 3 and the tape winding layer 2a can be eliminated.

As shown in FIGS. 3 and 4, both ends of the regulating body 33 are located inside the winding layer region of the tape winding layer 2a in a full winding state. Therefore, when the tape winding layer 2a tilts obliquely backward upon reception of the dropping impact, the corner of both the ends of the regulating body 33 may collide with the tape winding layer 2a to damage the tape edge. In order to prevent such damage of the tape edge, a flank 34 for avoiding the collision with the tape winding layer 2a is formed in the corner of both the side ends of the regulating body 33. As shown in FIG. 6, the flank 34 in this embodiment was formed by rounding the end section of the regulating body 33 from a bulge end face 33a to the inner surface side of the upper casing 1a.

Although the regulating body 33 has only to be placed at the rear the hub 3 on the casing within the limits of the maximum winding layer region of the tape winding layer 2a, the regulating body 33 is preferably placed at the region of 65 to 95% of the maximum winding layer region of the tape winding layer 2a.

Figure 7A:
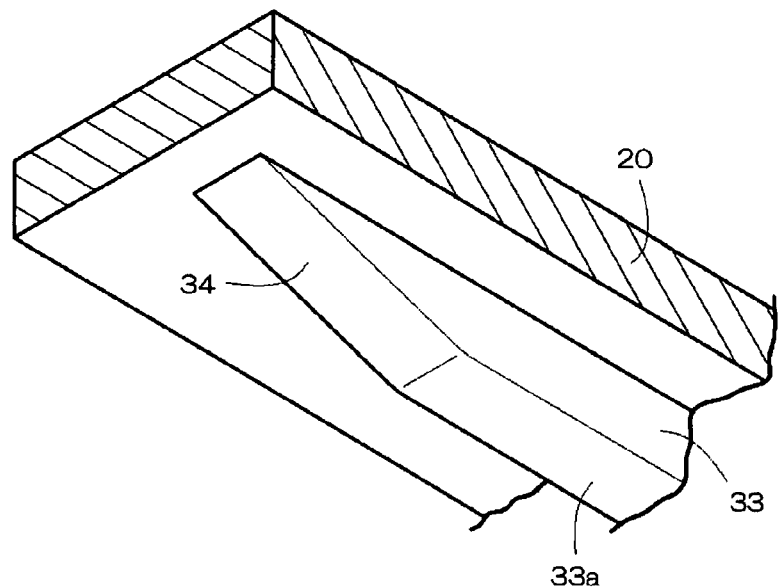
FIGS. 7A and 7B are perspective views showing a flank in another embodiment.
Figure 7B:
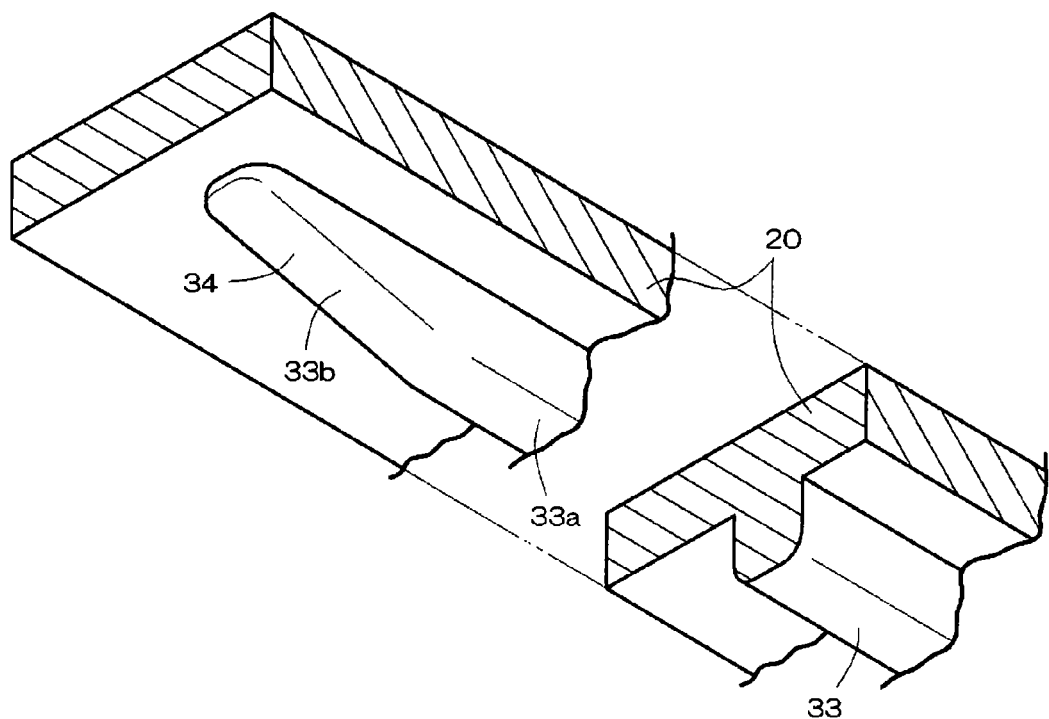

The flank 34 can be formed as shown in FIGS. 7A and 7B. In FIG. 7A, the flank 34 was formed so that it was gradually inclined downward from the bulge end face 33a to the inner surface side of the upper casing 1a. In this case, it is possible to prevent a corner section from being formed in the boundary between the flank 34 and the bulge end face 33a by rounding the boundary section between the flank 34 and the bulge end face 33a.

The flank 34 shown in FIG. 7B is formed in a way similar to that in FIG. 7A, and then the front and rear edges of the bulge end face 33a and the downward inclined face 33b are each rounded, so that when the tape winding layer 2a is supported by the regulating body 33, it become possible to present the tape edge from coming into contact with the front and rear edges of the bulge end face 33a and the downward inclined face 33b.

Without being limited to the above-mentioned embodiment, the regulating body 33 can be formed integrally with the upper casing 1a, and if necessary, the regulating body 33 can be formed with both ends extending beyond the maximum winding layer region of the tape winding layer 2a in the anteroposterior direction. In that case, the flank 34 of both the side ends of the regulating body 33 is omissible. It is not necessary to form the regulating body 33 in a straight rib shape, and it can be formed in a nonlinear rib shape such as bent linear shapes and curved linear shapes. Further, the regulating body 33 can be formed with a plurality of ribs extending across the roll region of the tape winding layer 2a in the anteroposterior direction.

Although the present invention has been described in detail with reference to the accompanying drawings, various variations and modifications are possible for those skilled in the art. Therefore, it should be understood that seen variations and modifications that come within cue scope and the spirit of the present invention are intended to be embraced therein.

What is claimed is:

1. A tape cartridge, comprising: a pair of right and left hubs for taking up a magnetic tape; and a hub locking structure for unrotatably locking and retaining both the hubs during unused time, each provided inside a main casing,
    wherein the hub locking structure is placed on an anterior side of an inner surface of an upper casing which constitutes the main casing, and
    wherein a regulating body for regulating inclination of a tape winding layer wound onto the hub is formed so as to bulge on a rear side of the inner surface of the upper casing, and the regulating body is placed on a position corresponding to a posterior portion of the tape winding layer.

2. The tape cartridge according to claim 1, wherein the regulating body is formed in an oblong rib shape having a bulge size almost identical to a thickness size of the hub locking structure in the inner surface of the upper casing, and
    wherein a flank for avoiding collision with the tape winding layer is formed in a side edge corner of the regulating body.

3. The tape cartridge according to claim 1, wherein the flank is formed by rounding an end section of the regulating body from a bulge end face to an inner surface side of the upper casing.

4. The tape cartridge according to claim 3, wherein front and rear edges of the bulge end face and the flank of the regulating body are rounded respectively.

5. The tape cartridge according to claim 1, wherein the flank is formed by inclining an end section of the regulating body downward from a bulge end face to an inner surface side of the upper casing.

6. The tape cartridge according to claim 5, wherein front and rear edges of the bulge end face and the flank of the regulating body are rounded respectively.

7. The tape cartridge according to claim 1,
    wherein a window plate formed from a transparent plastic material is fixed to the inner surface of the upper casing, and
    wherein the regulating body is integrally formed in the inner surface of the window plate.

8. The tape cartridge according to claim 1, wherein the regulating body is placed at a region of 65% to 95% of a maximum winding layer region of the tape winding layer.

* * * * *